UNITED STATES PATENT OFFICE.

ERNEST H. LINDEMANN, OF SAN FRANCISCO, CALIFORNIA, ASSIGNOR OF ONE-HALF TO LOUIS TARDOS, OF SAME PLACE.

METHOD OF DESTROYING PHYLLOXERA.

SPECIFICATION forming part of Letters Patent No. 240,261, dated April 19, 1881.

Application filed October 12, 1880. (No model.)

*To all whom it may concern:*

Be it known that I, ERNEST H. LINDEMANN, a citizen of the United States, residing at San Francisco, in the county of San Francisco and State of California, have invented or discovered a certain new and useful Method of Destroying the Phylloxera; and I do hereby declare that the following is a full, clear, and exact description of the invention, which will enable others skilled in the art to which it appertains to use the same.

The object of my invention is to destroy the insect called "phylloxera," which so infest the grape-fields, without injury to the vines, and at the same time to impart a nourishment or enriching substance to the roots thereof, whereby the vines are greatly benefitted and the destruction of the insect made certain.

In order to carry the first part of my invention or discovery into effect, I employ the waste material of chemical factories which are employed in the manufacture or production of nitric and muriatic acids, the residue or waste of which contains acid sodium sulphate. Of this refuse material from the manufacture of nitric and muriatic acids I make a saturated solution in warm or cold water, the density of which is about 22° Baumé.

To carry out the second part of my invention and apply the solution, the soil is removed from the roots of the vine to a sufficient depth to uncover the main portion thereof and to a diameter surrounding the stalk of about four feet. I then place upon the bottom of this excavation a quantity of semi-liquid "wool-swint," or the refuse obtained from the process of cleaning wool—say, to the depth of about four inches—and then apply ten or twelve gallons of the saturated solution as above formulated, after which the soil previously removed is replaced.

In making the application of the solution it should here be observed that young vines do not require as large a quantity of the solution as vines of older growth, yet ordinary judgment will only be required in this respect.

The semi-liquid wool-swint, which I place around the stalk or root of the vines, is an important factor in carrying out my invention or discovery, as it contains quite a percentage of potash and ammoniac salts, and these salts are neutralized and made available by the salts contained in the solution, which latter solution percolates through the animal manure and carries with it not only the insecticide properties contained therein, but the enriching and nourishing properties contained in the wool-refuse or wool-swint, so called.

Having thus described my invention, what I claim, and desire to secure by Letters Patent, is—

The herein-described method of destroying the phylloxera, consisting, first, in the application of a layer of semi-liquid wool-swint to the roots of the vines, and then adding thereto a saturated solution of acid sodium sulphate or refuse from the manufacture of nitric and muriatic acids, substantially as specified.

In testimony that I claim the foregoing I have hereunto set my hand and seal this 28th day of September, 1880.

E. H. LINDEMANN. [L. S.]

Witnesses:
C. W. M. SMITH,
WILMER BRADFORD.